June 28, 1927.

G. FORNACA 1,633,984

BRAKE OF THE EXPANDING SHOE TYPE

Filed Aug. 8, 1925

Inventor
Guido Fornaca,
Atty.

Patented June 28, 1927.

1,633,984

UNITED STATES PATENT OFFICE.

GUIDO FORNACA, OF TURIN, ITALY.

BRAKE OF THE EXPANDING-SHOE TYPE.

Application filed August 8, 1925, Serial No. 48,968, and in Italy August 29, 1924.

The object of this invention is to provide an improved brake of the expanding shoe type, in which the actual braking effort will be created automatically when the shoes are expanded and will be in proportion to the speed of rotation of the brake drum.

Accordingly, the parts of the brake are so constructed and arranged that one or the other shoe acts as a servo-brake depending on the direction of rotation of the brake drum.

The two segmental shoes (which may be identical and interchangeable) are pin-jointed at one end and their other ends are constrained towards a hollow boss, so that during the braking action, one shoe remains in contact with said boss while the other recedes by the rotation of the drum whereby the actual braking effort is transmitted through this shoe to the other shoe which remains in contact with the boss.

Means are provided for expanding the shoes, comprising a wiper mounted within the hollow boss on a shaft which is free to undergo a lateral displacement as soon as the shoe which acts as a servo-brake comes into contact with the drum. Preferably one end of the wiper shaft is mounted on a ball bearing in a fixed support while its other end is free to move laterally in a slot formed in the hollow boss.

Adjustable means are, or may be, provided to keep the two shoes at rest when the brake is inoperative.

An embodiment of the brake suitable for a motor vehicle is illustrated, by way of example, on the accompanying drawing; wherein:—

Figure 1:
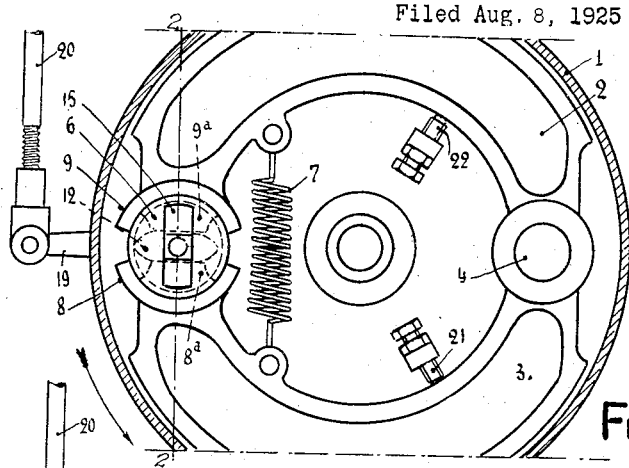
Figure 1 is a sectional elevation on the brake in the state of rest.

In the drawing, 1 indicates the brake drum and 2 and 3 the segmental brake-shoes disposed within said drum.

The shoes are pin jointed together at 4 and their other ends, in the form of cylindrical segments 8, 9, normally engage a hollow boss 6 which forms a part of a fixed frame 5.

A spring 7 constrains the ends 8, 9 of the shoes towards each other so that when the shoes are at rest, said ends embrace the hollow boss 6 and the shoes remain suspended from this latter without touching the drum 1, being prevented from oscillating by adjustable stops 21, 22. The ends 8, 9 of the shoes have extensions $8^a$, $9^a$ projecting through peripheral openings in the hollow boss 6.

Within said boss 6 is a wiper 12 mounted on a small shaft 16 one end of which is supported by a ball and socket bearing 17 provided in the end 18 of the fixed frame 5, while its other end is carried by a slide 14 movable laterally in a slot 15 formed in the end of the hollow boss. Fixed on the shaft 16 is a lever 19 to which a control rod 20 is connected.

It is apparent that the shaft 16 can oscillate about the ball and socket bearing 17 in the plane of the guiding slot 15 and, during the braking operation as controlled by the rod 20, the wiper 12 can also move laterally towards one or the other shoe according to the direction of rotation of the brake drum.

Figure 2:
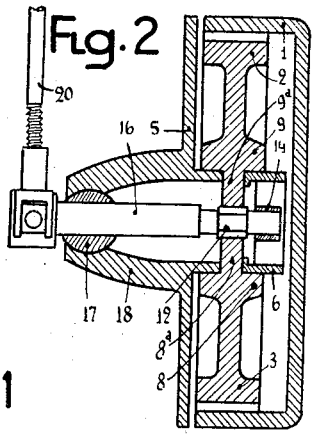
Figure 2 is a cross section on the line 2—2 of Fig. 1.

The brake acts in the following way:

In the position of rest the various parts assume the positions shown in Figures 1 and 2, both shoes engaging the hollow boss 6 on which they remain suspended under the tension of the spring 7, and the stops 21 and 22 preventing oscillation of the shoes so that the drum 1 can rotate freely without friction.

Figure 3:
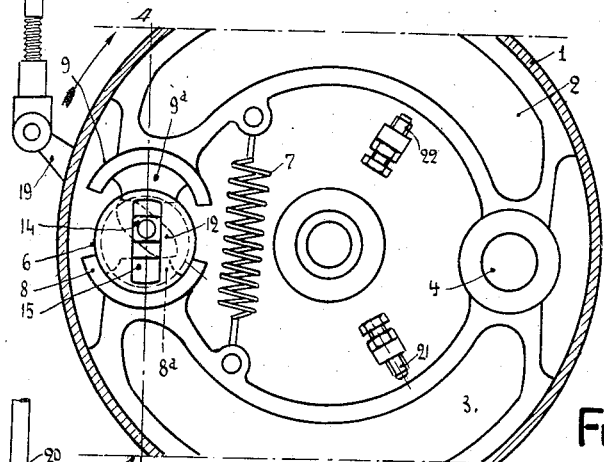
Figure 3 is a view similar to that of Fig. 1, but showing the operation of the brake with clockwise rotation of the brake drum.
Figure 4:
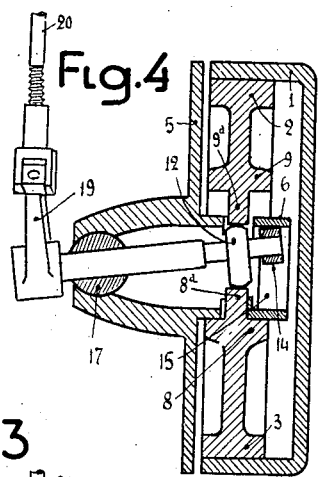
Figure 4 is a section on the line 4—4 of Fig. 3.

If the wiper 12 is turned, it acts on the extensions $8^a$ and $9^a$ and the ends 8 and 9 of the shoes will be compelled to recede from the hollow boss 6 until the shoes begin to exert pressure on the drum 1. At that moment, if the drum is rotating clockwise (Figs. 3 and 4) the two shoes will be moved as a whole in the same direction until the end 8 of shoe 3 again contacts with the hollow boss 6. When this occurs the shoe 2, owing to the friction of the drum 1, will butt on the shoe 3 through the pivot pin 4 and a powerful braking action will be obtained because the shoe 2 then acts as a control agency or servo-brake for the shoe 3, which is consequently pressed against the drum 1 with a pressure far greater than that which can be furnished by the wiper 12. It is to be observed that this powerful braking action is obtained with a slight rotary movement of the wiper.

Figure 5:
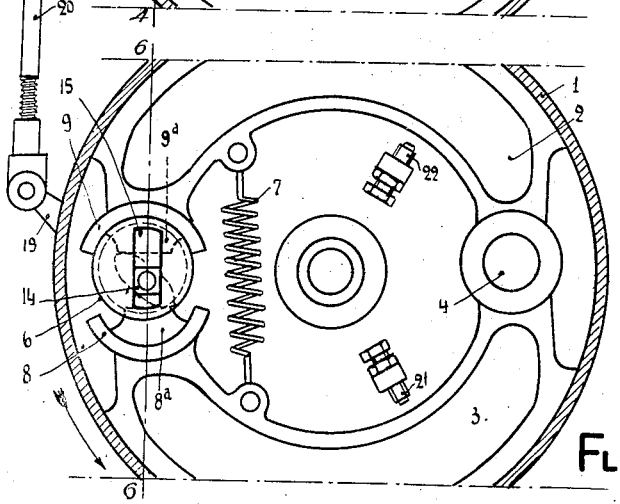
Figure 5 is a view similar to that of Fig. 1, but showing the operation of the brake with anti-clockwise rotation of the brake drum.
Figure 6:
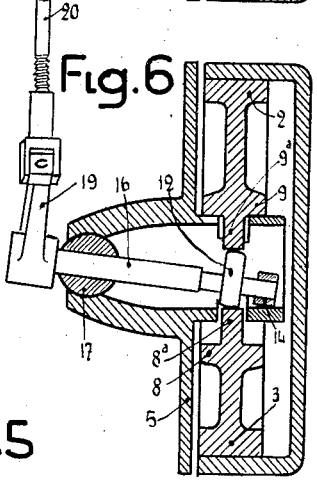
Figure 6 is a section on the line 6—6 of Fig. 5.

If the drum 1 is rotating in an anticlockwise direction (Figs. 5 and 6) a similar result is obtained but in this case the shoe 3 acts as a servobrake for the shoe 2.

The arrangement described may be employed in various machines or apparatus where a brake is required. In the particular case of a motor vehicle it may serve indifferently either for driving wheels or for the steering wheels.

Having now particularly described and ascertained the nature of my said invention, and in what manner the same is to be performed, I declare that what I claim is:—

1. In a brake of the expanding shoe type, the combination with a drum, of two segmental shoes pivoted at one end on a floating pin, a fixed hollow boss on which the other ends of said shoes are spring urged, and a wiper for actuating the shoes mounted within the boss and a shaft on which said wiper is mounted free to undergo lateral displacement.

2. In a brake of the expanding shoe type, the combination with a drum, of two segmental shoes pivoted at one end on a floating pin, a fixed hollow boss having peripheral opening and on which the other ends of said shoes are spring urged, extensions on said shoes projecting through said openings, means within the hollow boss for actuating the shoes comprising a laterally movable shaft and wiper mounted on the latter.

3. In a brake of the expanding shoe type, the combination with a drum, of two segmental shoes pivoted at one end on a floating pin, a fixed hollow boss having peripheral openings and on which the other ends of said shoes are spring urged, extensions on said shoes projecting through said openings, means within the hollow boss for actuating the shoes comprising a ball and socket bearing, a shaft mounted therein at one end and guided at the other end in a vertical slot in the hollow boss, and a wiper fixed on said shaft.

4. In a brake of the expanding shoe type, the combination with a drum, of two segmental shoes within the latter pivoted together at one end by a floating pin, a frame at one side of the drum having a hollow boss on the outside thereof and extending within the drum, the free ends of said shoes having extensions normally projecting through peripheral openings in said boss, a wiper interposed between said extensions, a rotary shaft on which the wiper is mounted having a ball and socket connection at one end with said hollow boss, and a slide on the other end of the shaft movable in a guide slot formed in the inner end of the boss.

In testimony that I claim the foregoing as my invention, I have signed my name.

GUIDO FORNACA.